US009255396B2

(12) United States Patent
Eberhart

(10) Patent No.: US 9,255,396 B2
(45) Date of Patent: *Feb. 9, 2016

(54) BOLTED STRUCTURAL CONNECTION SYSTEMS

(71) Applicant: Davis Eberhart, Pala Cedro, CA (US)

(72) Inventor: Davis Eberhart, Pala Cedro, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/663,119

(22) Filed: Mar. 19, 2015

(65) Prior Publication Data

US 2015/0240482 A1  Aug. 27, 2015

Related U.S. Application Data

(63) Continuation of application No. 14/175,789, filed on Feb. 7, 2014.

(60) Provisional application No. 61/762,587, filed on Feb. 7, 2013.

(51) Int. Cl.
  *E04B 1/58* (2006.01)
  *E04H 17/14* (2006.01)
  *F16B 7/04* (2006.01)

(52) U.S. Cl.
  CPC .............. *E04B 1/58* (2013.01); *E04H 17/1421* (2013.01); *F16B 7/044* (2013.01); *F16B 7/0486* (2013.01); *F16B 7/0493* (2013.01); *Y10T 29/49625* (2015.01); *Y10T 29/49947* (2015.01); *Y10T 403/7062* (2015.01)

(58) Field of Classification Search
  CPC ...... F16B 7/044; F16B 7/0486; F16B 7/0493; Y10T 403/7062; Y10T 403/342; Y10T 403/347; Y10T 403/42; Y10T 29/49947; Y10T 29/49625

See application file for complete search history.

(56) References Cited

U.S. PATENT DOCUMENTS

| 1,840,048 | A |   | 1/1932 | Michelman |        |
|-----------|---|---|--------|-----------|--------|
| 1,950,965 | A |   | 3/1934 | Blackburn |        |
| 2,445,545 | A |   | 7/1948 | Verner    |        |
| 2,839,320 | A |   | 6/1958 | Hill      |        |
| 2,847,237 | A |   | 8/1958 | Ackerman  |        |
| 2,876,027 | A | * | 3/1959 | Sulmonetti | 403/53 |
| 2,906,551 | A |   | 9/1959 | May       |        |
| 3,053,351 | A | * | 9/1962 | Fulcher   | 52/109 |
| 3,157,388 | A |   | 11/1964 | Nelson   |        |
| 3,486,739 | A |   | 12/1969 | Nelson et al. |    |

(Continued)

OTHER PUBLICATIONS

Key Safety, Inc:, Kee Klarnp®, http://keesafety.com/products/kee_klamp/catalog, Jun. 5, 2014, 6 pages.

(Continued)

*Primary Examiner* — Sarang Afzali
(74) *Attorney, Agent, or Firm* — Ryan Kromholz & Manion, S.C.

(57) ABSTRACT

Systems and methods directed to the art of connectors and assembling structures, such as securing rail members together to form an assembled structure. A connector system capable of inducing a clamping stress in a connector and thereby securing at least one rail within the connector. The connector has a plurality of channel openings and a plurality of brace members extending outward from the connector and between the plurality of channel openings, each brace member has at least one brace aperture therethrough, and each brace member faces one other brace member with the respective brace member apertures aligned.

6 Claims, 16 Drawing Sheets

(56) References Cited

U.S. PATENT DOCUMENTS

| | | |
|---|---|---|
| 3,520,564 A | 7/1970 | Peterson |
| 3,524,627 A | 8/1970 | Boyanton et al. |
| 3,604,687 A | 9/1971 | Moore |
| 3,633,250 A | 1/1972 | Romney |
| 3,932,047 A | 1/1976 | Crossan |
| 3,972,639 A | 8/1976 | Lening |
| 4,122,631 A | 10/1978 | Batcheller |
| 4,208,038 A | 6/1980 | Reid |
| 4,397,448 A | 8/1983 | Dillon |
| 4,459,634 A | 7/1984 | Stefanou |
| 4,682,761 A | 7/1987 | Hanneken |
| 4,819,582 A | 4/1989 | Lichvar |
| 4,841,708 A | 6/1989 | Johnston |
| 5,181,684 A | 1/1993 | Sager |
| 5,297,890 A | 3/1994 | Commins |
| 5,454,662 A | 10/1995 | Skibitzke et al. |
| 5,593,143 A | 1/1997 | Ferrarin |
| 5,697,129 A | 12/1997 | Newville |
| 6,386,519 B1 | 5/2002 | Priefert |
| 6,491,294 B1 | 12/2002 | Hyatt |
| 6,527,256 B2 | 3/2003 | Doyle, Jr. |
| 6,530,561 B2 | 3/2003 | Larsen et al. |
| 6,688,046 B2 | 2/2004 | Perkins |
| 6,883,761 B2 | 4/2005 | Boon et al. |
| 6,896,437 B2 | 5/2005 | Morgan et al. |
| 7,062,836 B1 | 6/2006 | Sorgi |
| 7,182,543 B2 | 2/2007 | Kondo et al. |
| 7,243,955 B2 | 7/2007 | Krausz et al. |
| 7,293,745 B2 | 11/2007 | Catapano |
| D576,870 S | 9/2008 | Eason et al. |
| 7,637,076 B2 | 12/2009 | Vaughn |
| 7,784,744 B2 | 8/2010 | Becker |
| 2006/0192192 A1 | 8/2006 | Hammond et al. |
| 2006/0201087 A1 | 9/2006 | Cutforth |
| 2007/0080333 A1 | 4/2007 | Perry |
| 2007/0080334 A1 | 4/2007 | Perry |
| 2009/0249591 A1 | 10/2009 | Melic |
| 2010/0089697 A1* | 4/2010 | Kreller .......................... 182/113 |
| 2010/0192506 A1 | 8/2010 | Allred, III et al. |
| 2011/0262215 A1 | 10/2011 | Thacker |
| 2014/0223745 A1* | 8/2014 | Eberhart ................... 29/897.31 |

OTHER PUBLICATIONS

The Hollaender Manufacturing Co.; Speed-Rail®, http://www.hollaender.com, Jun. 5, 2014, 8 pages.

International Search Report with Written Opinion dated Jul. 8, 2014, regarding International Application No. PCT/US2014/015392, 8 pages.

* cited by examiner

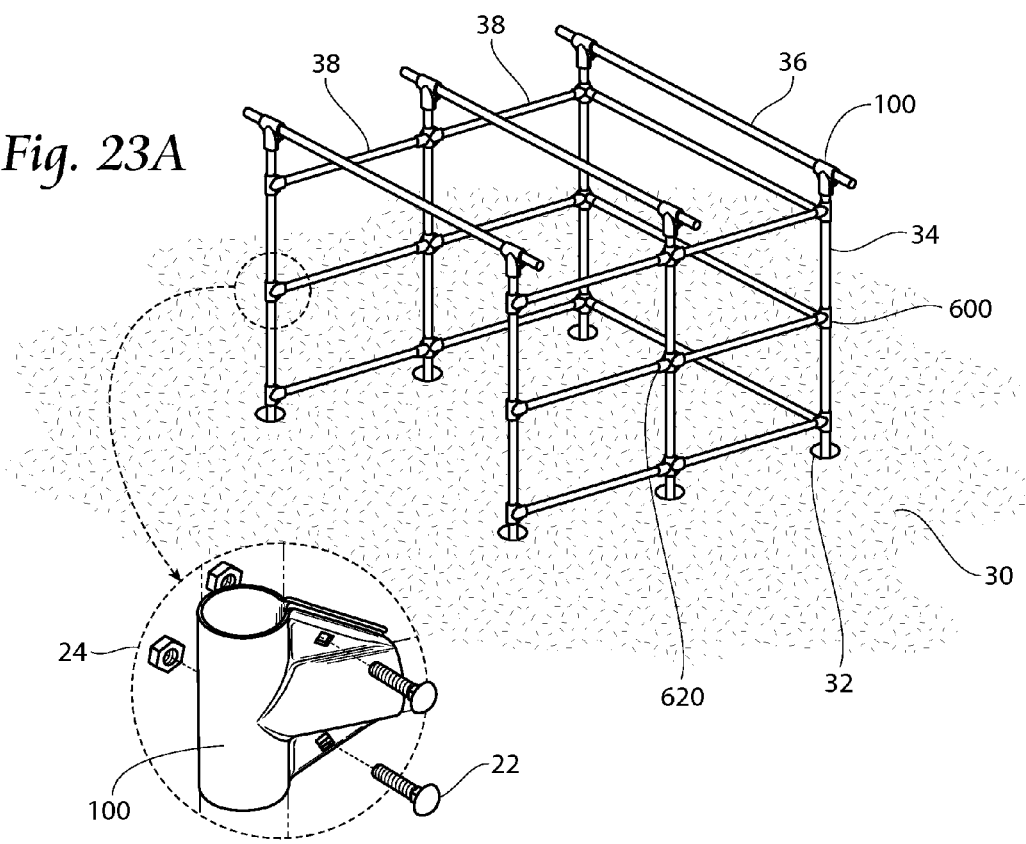

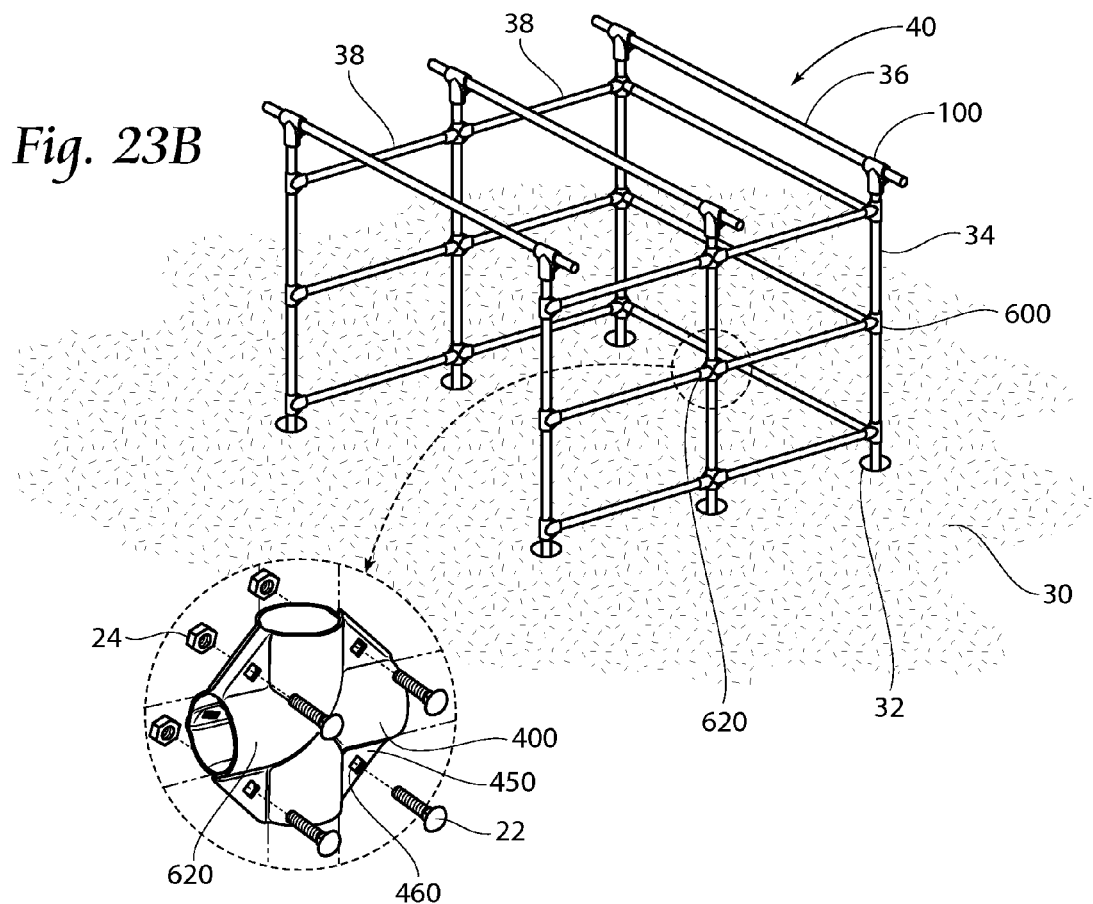

BOLTED STRUCTURAL CONNECTION SYSTEMS

RELATED APPLICATIONS

This is a continuation application of U.S. patent application Ser. No. 14/175,789, filed 7 Feb. 2014, which claims the benefit of U.S. Provisional Patent Application Ser. No. 61/762,587, filed 8 Feb. 2013, and entitled "Bolted Structural Connection Systems."

BACKGROUND OF THE INVENTION

The present invention relates to connectors for paneling, fences, buildings and more particularly to connectors for quickly erecting and building permanent/non-permanent fences and structures.

Prior art joints and connectors have been well known and have been used in construction projects. Examples of such structures include fences, barriers, and frames for buildings, such as barns or storage sheds. Generally, the connectors are designed for quickly and easily building such structures. However, the prior art connectors have shortcomings, such as being overly cumbersome, having a complicated connection system, or lacking sufficient strength required for permanent structures.

For example, FIG. 1 shows a prior art connector used for connecting temporary fencings structures. While this type of connector can be used to quickly erect a temporary fence, it does not provide a solid connection for a permanent fencing structure. In general, prior art connectors tend not to be able to sufficiently provide resistance against forces, including moment resistance, linear/translational, and friction forces, that act on the joint or connector when the fence or structure is erected. That is, when a fence or building is erected, the forces act on the connector in opposing manners such that the connector does not adequately provide a stable structure.

Ideal joints or connectors to overcome these issues are metal joints that are welded joints, e.g. metal welded joints. However, welded joints are not quickly and simply capable of erecting a structure, as they do, in fact, require welding for proper fastening.

SUMMARY OF THE INVENTION

The present invention provides connectors and systems for joining together various sections of railing, piping, or similar materials. The connectors are capable of simulating welded joints, yet allow for quick construction of a structure.

Moreover, the present invention provides resistance to moments in specific axis' and translation forces between rail-to-rail and rail-to-connector connections to cover all six degrees of freedom. It further reduces extraneous costs for additional bracing because it is capable of resisting forces in all six degrees of freedom without requiring any welding performed by expensive skilled labor.

One aspect of the invention provides a connector for joining rail members of a fence or a structure, the connector having at least one channel; a plurality of brace members extending outward from and along the at least one channel, each brace member having at least one brace aperture therethrough, each brace member facing one other brace member with the respective brace member apertures aligned; and a fastener received by each aligned set of apertures, whereby when the at least one fastener is tightened a clamping stress is induced in the connector.

The at least one channel may also have a plurality of connector members.

Each connector member may also have at least one of an inner clasp and an outer clasp opposite the brace member.

The at least one facing member may further have a flange member.

The connector may also have a gap between the facing brace members.

The connector may also have a swivel mechanism.

The swivel mechanism may have an opening and a hub received by an opening.

The connector may also have a pivot mechanism and a collar, whereby the pivot mechanism pivotally joins the connector and the collar.

Another aspect of the invention relates to a system for constructing a fence or a structure, the system having a plurality of connectors each comprising at least one channel; a plurality of brace members extending outward from and along the at least one channel from each connector, each brace member having at least one brace aperture therethrough, and each brace member facing one other brace member with the respective brace member apertures aligned; a plurality of rails; a plurality of upstanding members; whereby the at least one channel is configured to receive one of the plurality of rails and the plurality upstanding members; a plurality of fasteners, whereby each of the plurality of brace member apertures is configured to receive one of the plurality of fasteners; and whereby a clamping stress is induced in each connector upon tightening of the plurality of fasteners, thereby securing the rail member and each upstanding member in the connectors.

The system may also have a connector with a channel composed of a plurality of connector members.

The plurality of connector members may each have at least one of an inner clasp and an outer clasp opposite the brace member.

The system may also have a facing brace member with a flange member.

The system may also have a gap between the facing brace members.

Another aspect of the invention provides a method of assembling a structure on a surface comprising the steps of providing a plurality of upstanding poles; providing a plurality of rails; providing a plurality of connectors; each connector comprising at least one channel and a plurality of brace members extending outward from and along the at least one channel, each brace member having at least one brace aperture therethrough, each brace member facing one other brace member with respective brace member apertures aligned; providing a plurality of fasteners; securing the plurality of upstanding poles to the surface; joining the upstanding poles together with the plurality of rails with the plurality of connectors by inserting the poles and rails in the connector channels; installing the plurality of fasteners in the plurality of aligned brace apertures; and inducing a clamping stress in the connector by tightening the plurality of fasteners, thereby securing the upstanding poles and plurality of rails.

The method of assembling a structure on a surface where the at least one of the connectors has a channel comprising a plurality of connector members.

The method of assembling a structure on a surface where each connector member comprises at least one of an inner clasp and an outer clasp opposite the brace member.

The method of assembling a structure on a surface where at least one facing brace members further comprises a flange member.

The method of assembling a structure on a surface where there is a gap between the facing brace members.

The method of assembling a structure on a surface with the additional the steps of providing a roof structure; providing a plurality of siding pieces; and installing the roof structure and the plurality of siding pieces to the upstanding poles and the plurality of rails.

The method of assembling a structure on a surface where the upstanding poles are secured to the surface by a connector further comprising a base plate extending radially outward from the channel and substantially perpendicular to the brace members.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
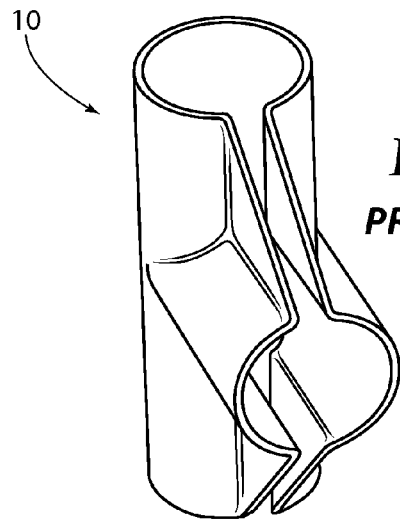
FIG. 1 is a perspective view of a prior art connector.

As noted above, FIG. 1 shows a prior art connector 10 that is used for connecting piping or tubing for erecting temporary fences and structures. The connector 10 allows for the insertion of rails or similar device (see FIG. 21 for an example of a rail) to form a fence or frame. The connector 10 can be used for simple constructions, which do not have large forces acting upon them. Likewise, the connector 10 will be able to secure the fence or frame in place, but would need additional fasteners if the connector 10 was to be used to provide stability to a more permanent structure.

Figure 2A:
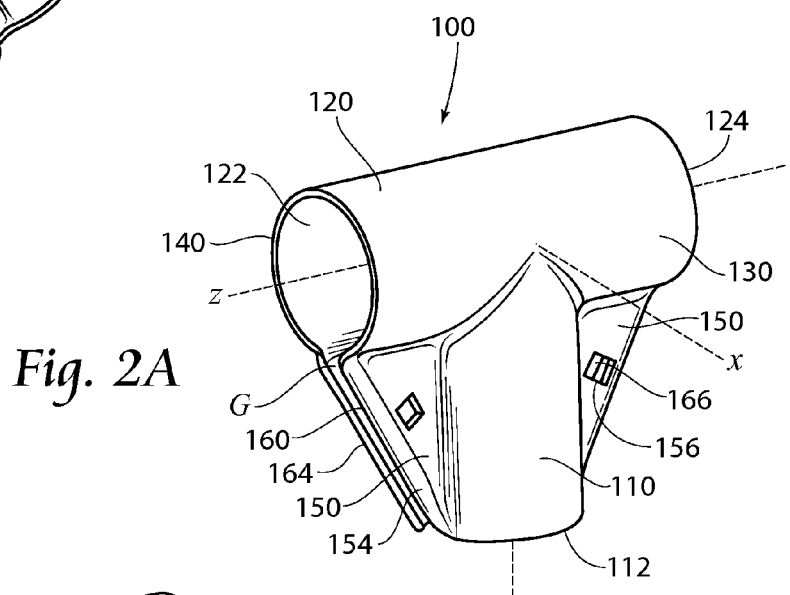
FIG. 2A demonstrates an embodiment of a connector according to the present invention.
Figure 21:
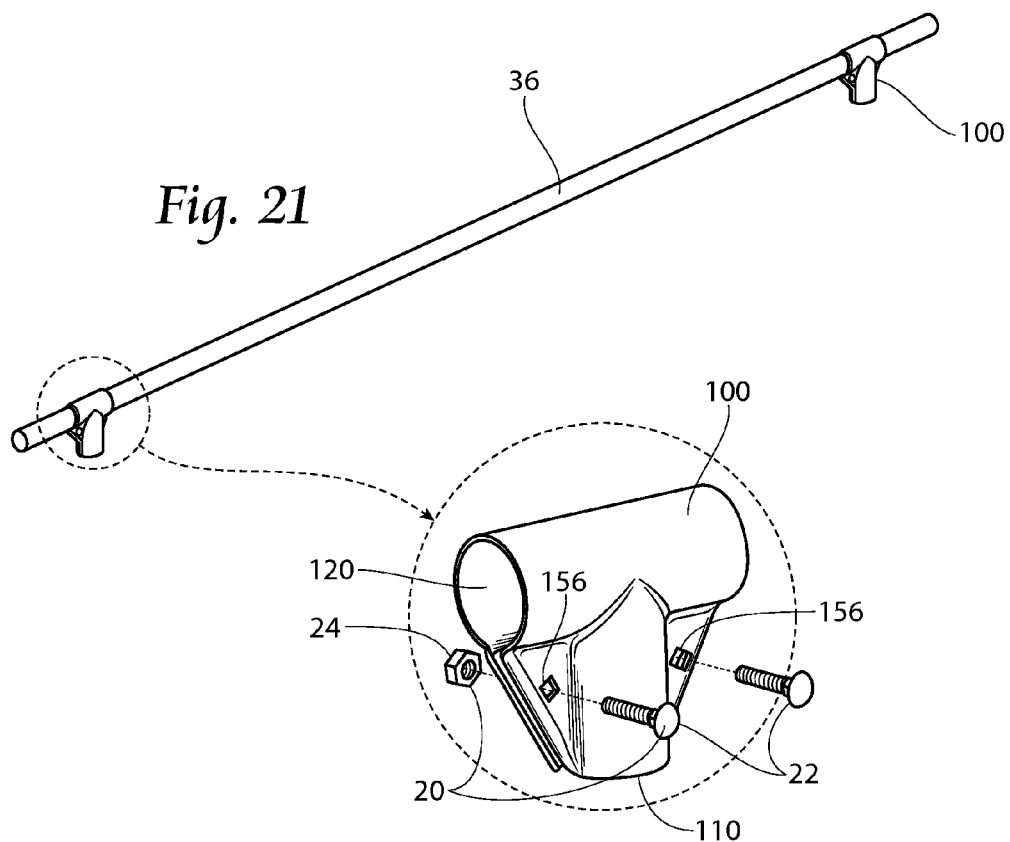

An embodiment of a connector 100 according to the present invention that allows for quick, sturdy erection of fences, frames, buildings, and similar structures is shown in FIG. 2A. It has a terminal channel 110, having a rail receiving end 112, and a through channel 120, having a first receiving end 122 and a second receiving end 124. Rails (not shown) may be inserted into the channels 110 and 120 and may be limited in insertion depth due to abutment with the connector itself or other inserted rails. The connector 100 is capable of receiving three rails, one in each receiving end (112, 122, and 124), or two rails wherein one of the rails is positioned through the through channel 120 as shown in FIG. 21. For explanatory purposes, the channels in the embodiments disclosed herewithin are shown having a circular cross-section; however, it should be noted that the invention is not intended to be limited to only having channels of circular cross-sections.

Figure 2B:
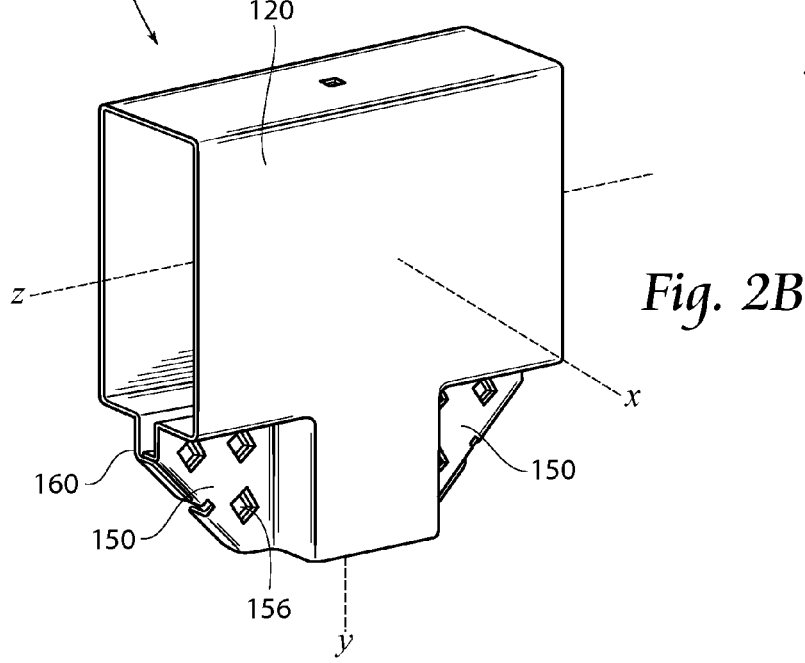
FIG. 2B is another embodiment of the connector shown in FIG. 2A according to the present invention.

Other channel cross sections include, but are not limited to; square, rectangular, elliptical, I-beam, and angle channel to name a few. A connector 100 according to the present invention with channels of a rectangular cross-section is shown in FIG. 2B. It is also within the scope of the present invention to provide connectors with channels of more than one cross-section shape. As a non-limiting example, a connector may have one receiving end having a circular cross-section and another receiving end having a square cross-section. However, for the sake of simplifying the disclosure of the present invention, the embodiments will be described with respect to channels having a circular cross-section.

Additionally, the connectors according to the present invention may comprise any metals, composite materials, or polymers having the preferred characteristics as disclosed herein.

Still referring to the connector 100 in FIG. 2A, each channel 110 and 120 has a non-continuous periphery defining a gap G which further defines a first section 130 and a second section 140 of the connector 100. The gap G promotes ease of rail installation as it provides receiving ends 112, 122, and 124 having a greater diameter than the inserted rail, and also promotes rail security by permitting the channels 110 and 120 to be tightened around the inserted rail (as discussed further below). Furthermore, first section planar corner braces 150 extend between the receiving end 112 of the terminal channel 110 to the adjacent respective receiving end 122 or 124 of the through channel 120, and extend back to where the terminal channel 110 and the through channel 120 intersect. Additionally, second section planar corner braces 160 extend between the receiving end 112 of the terminal channel 110 to the adjacent respective receiving end 122 or 124 of the through channel 120, and extend back to where the terminal channel 110 and the through channel 120 intersect.

Each corner brace 150 and 160 has a flange 154 and 164, respectively, wherein the first section corner brace flange 154 is positioned to the inside of the second section corner brace flange 164. This relationship between the flanges 154 and 164, substantially prohibits any translational or rotational movement of the first section 130 relative to the second section 140 along the Z-axis and about the X-axis respectively.

Additionally, the flanges 154 and 164 provide added strength to the braces 150 and 160, respectively, and thereby limit distortion of the brace when tightened. Therefore, the flanges may be bent in any direction or fashion known and still be within the purview of the present invention.

Furthermore, the corner braces 150 each have an opening 158 which is in alignment with the openings 168 (hidden) of the opposing corner braces 160. The arrangement allows for fasteners 20, e.g. nuts and bolts (shown in FIG. 21), to be inserted through the openings 156 and 166 and tightened to provide further reinforcement of the rails (see FIG. 21) and additional stability to a structure (see FIG. 24).

In addition, as stated previously, the corner braces 150 and 160 exhibit limited deflection when fasteners 20 (see FIG. 21) are tightened, providing a lock-washer-like action. For example, when the connector 100 is tightened, the flanges 154 of the corner braces 150 will may contact with the opposite corner braces 160, thus creating a space (hidden) between the corner braces 150 and 160. Therefore, during tightening of the fasteners 20, the corner braces 150 and 160 deflect towards one another. Due to the natural desire of the material comprising the corner braces 150 and 160 wanting to retain its original shape, a force is imposed against the fasteners 20, more specifically between the threads of a bolt 22 and a nut 24 (see FIG. 21), in the opposite direction of tightening thus inhibiting loosening of the fasteners 20 (see FIG. 21), much the same way as a lock-washer would. Moreover, tightening of the fasteners 20 also creates substantial clamping force which induces a hoop stress and/or a bending, torsional, and tensile stress in the connector as the connector channels are secured, thereby providing an even more secure connection of the rails. It should also be noted that channels 110 and 120, although shown in FIG. 2A as being at a 90 degree orientation with respect to each other, it is conceivable that the orientation with respect to each other could be less than 90 degrees such as 60 degrees or 45 degrees to name a few. In addition, each brace 150 and 160 has been designed to improve moment resistance about the X-axis.

Figure 3A:
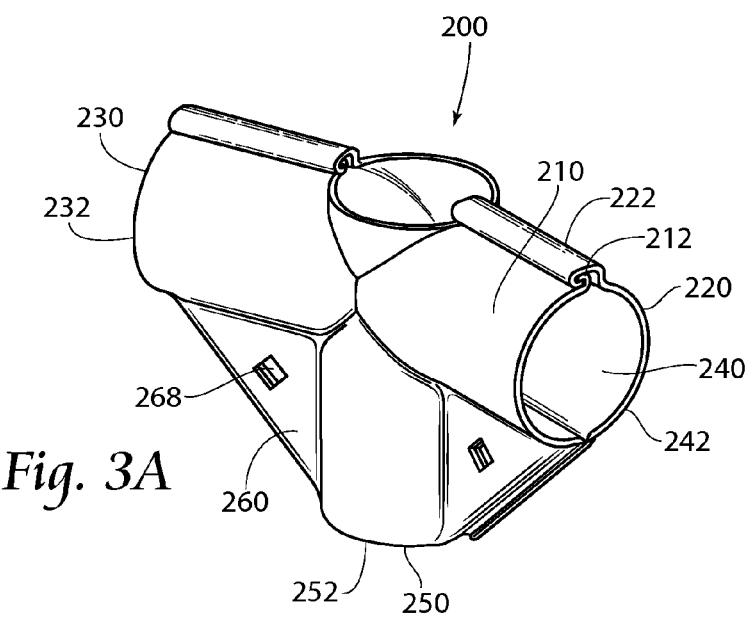
FIGS. 3A-3C demonstrate a third embodiment of a connector according to the present invention comprising a plurality of members.

Another embodiment of a connector 200 according to the present invention is shown in FIG. 3A. The structure generally comprises a first section 210 and a second section 220, shown in FIGS. 3B and 3C, respectively. Each of the sections 210 and 220 has one half of an interfacing clasp, 212 and 222, at their respective top sides. The sections 210 and 220 may be fit together by engaging the clasps 212 and 222 together to form the overall connector 200 of FIG. 3A. It should be understood that reference to the top of the connector 200 is for reference only and should not limit the connector 200 to any spatial arrangement.

The connector 200 provides a first channel 230, a second channel 240, and a third channel 250 for receiving three different rails (not shown) for use in constructing a frame structure. Furthermore, the channels 230, 240, and 250 have receiving ends 232, 242, and 252, respectively, for receiving the rails. The inserted rails may be limited in insertion depth due to abutment with the connector itself or other inserted rails.

Figure 3B:
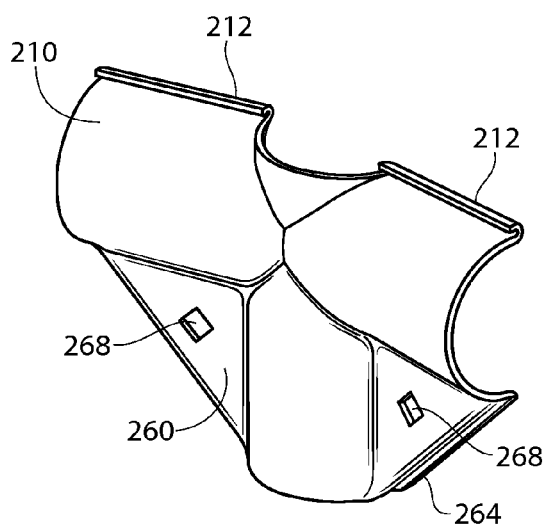
Figure 3C:
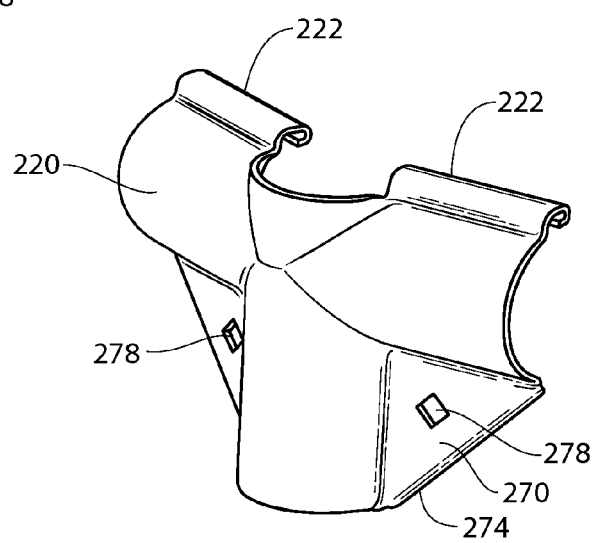

Referring further to FIGS. 3A-3C, the connector 200 also comprises planar corner braces 260 and 270, which are substantially similar to the corner braces 150 and 160 of the embodiment shown in FIG. 2A. Each corner brace 260 and 270 has a flange 264 and 274, respectively, wherein the first section corner brace flange 264 is positioned to the inside of the second section corner brace flange 274 when assembled. This relationship between the flanges 264 and 274 substantially prohibits any translational movement of the first section 210 relative to the second section 220.

Additionally, each of the braces 260 and 270 has an opening 268 and 278, respectively, which aligns with the opening of the opposing brace when assembled. As mentioned above in the description of the connector 100 in FIG. 2A, the arrangement allows for further fasteners 20, e.g. nuts 24 and bolts 22, (see FIG. 21) to be inserted through the openings to provide a second level of connectivity for further reinforcement of the rails (see FIG. 21) and additional stability to a structure (see FIG. 24).

Furthermore, in the embodiment shown in FIG. 3A, the first channel 230 is not axially aligned with the second channel 240. This arrangement may be preferred when building a structure in which 90 degree wall corners are not desired; however, this embodiment should not be viewed as limiting. A connector having a first channel and a second channel aligned axially is also within the scope of this invention.

Figure 4A:
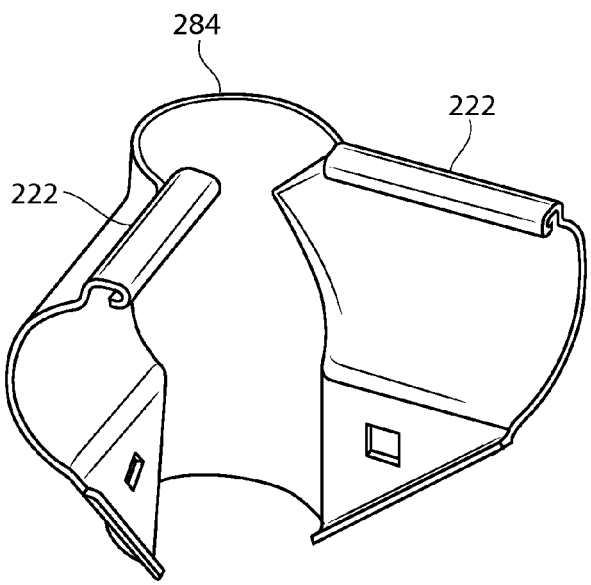
FIGS. 4A-4C demonstrate a fourth embodiment of a connector according to the present invention comprising a plurality of members.
Figure 4B:
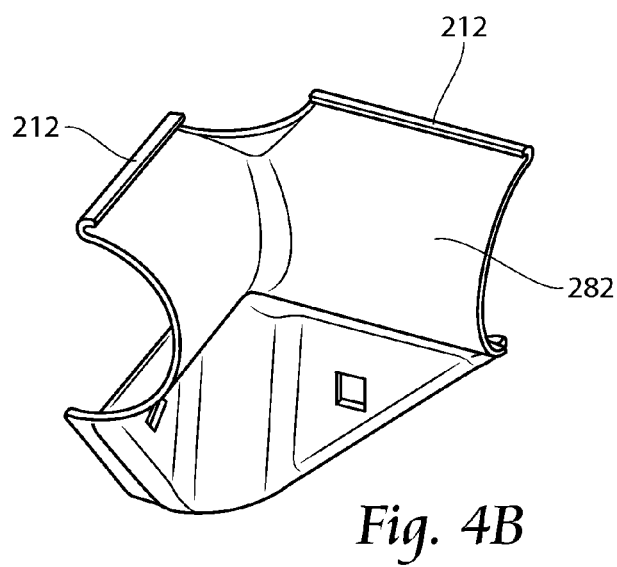
Figure 4C:
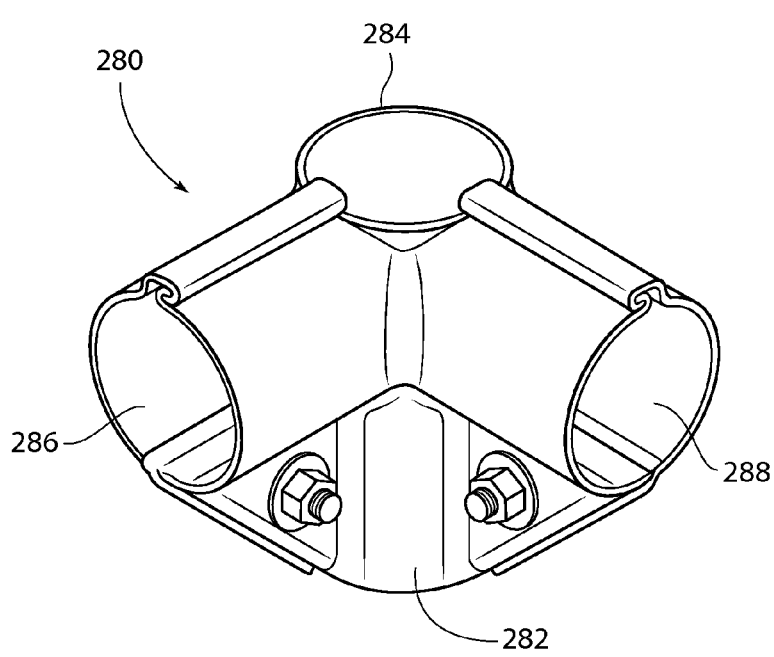

Additionally, another embodiment as shown in FIGS. 4A-4C is a connector 280 having a first section 282, forming an interior corner member, and a second section 284, forming an exterior corner member. When combined, they create a corner connector having a first channel 286 perpendicular to a second channel 288, but otherwise having the same features as that of the embodiment in FIGS. 3A-3C. Therefore, it is within the purview of the current invention to have a connector employing the aforementioned features such as the clasps (212 and 222 as shown in FIGS. 3A-3C) and the corner braces (260 and 270 as shown in FIGS. 3B and 3C) wherein a first channel is disposed from a second channel at any angle from 90 to 180 degrees. It is also conceivable for the angle to be less than 90 degrees.

Figure 5A:
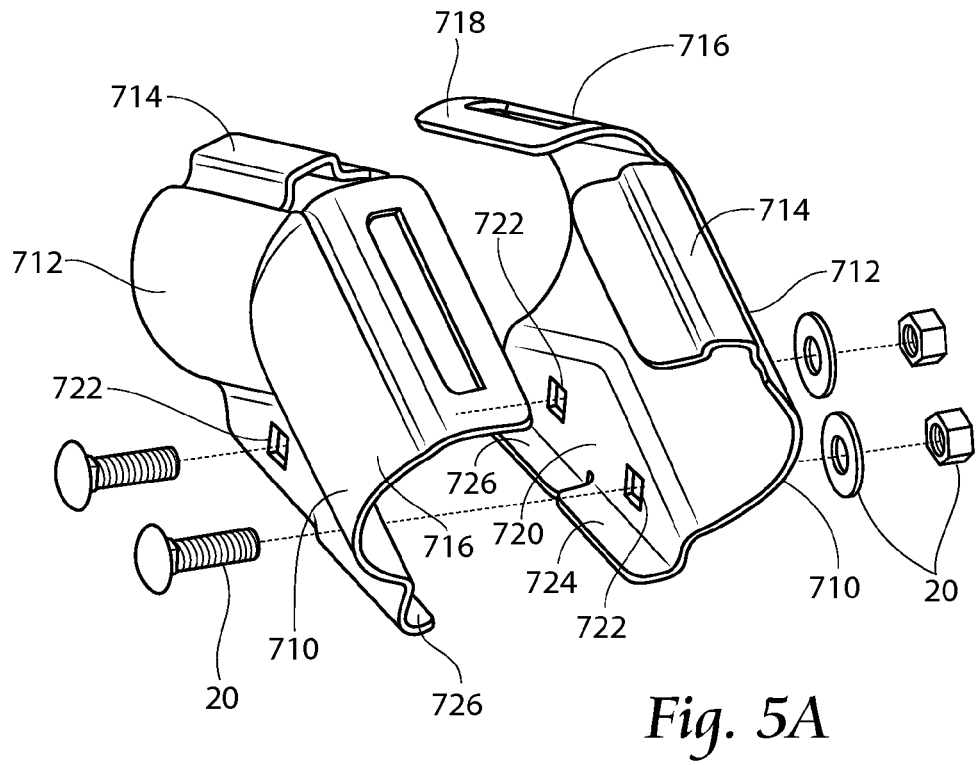
FIG. 5A is an exploded view of a fifth embodiment of a connector according to the present invention comprising a plurality of members.
Figure 5B:
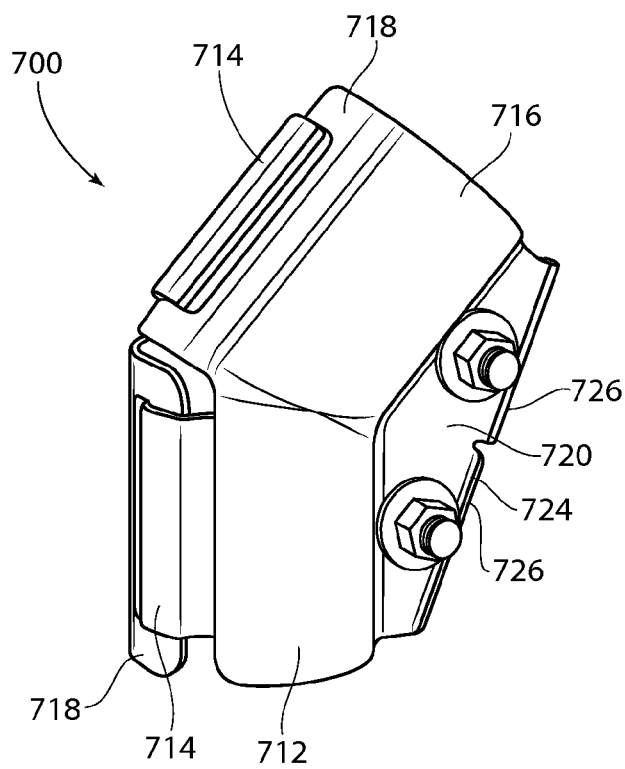
FIG. 5B is a perspective view of the connector of FIG. 5A.

Another embodiment 700 of a connector according to the present invention is shown in FIGS. 5A and 5B. As shown in FIG. 5A, an obtuse member 710, having a first half 712 and a second half 716, incorporates a male clasp 714 at the top of the first half 712 and a female clasp 718 at the top of the second half 716. These types of clasps are sometimes referred to as over/under clasps. Additionally, at the bottom of the member 710 there is a brace 720 extending through the first half 712 and continuing through the second half 716. The brace 720 has at least one hole 722 located in each of the first half 712 and the second half 716 for inserting fasteners 20. Furthermore, at the bottom of the brace 720 on the first half 712, the brace 720 has an internal flange 724, and at the bottom of the brace 720 on the second half 716, the brace 720 has an external flange 726. The connector 700 is formed by joining two of the obtuse members 710 together, with the male clasp 714 of the first half 712 of one obtuse member 710 mating with the female clasp 718 of the second half 716 of an opposing obtuse member. Moreover, the internal flange 724 of the first half 712 of one of the obtuse members 710 is positioned to the inside of the external flange 726 of the second half 716 of the opposing obtuse member, much in the same way as other embodiments described above. Fasteners 20 may be used to further secure the connector 700.

Figure 6A:
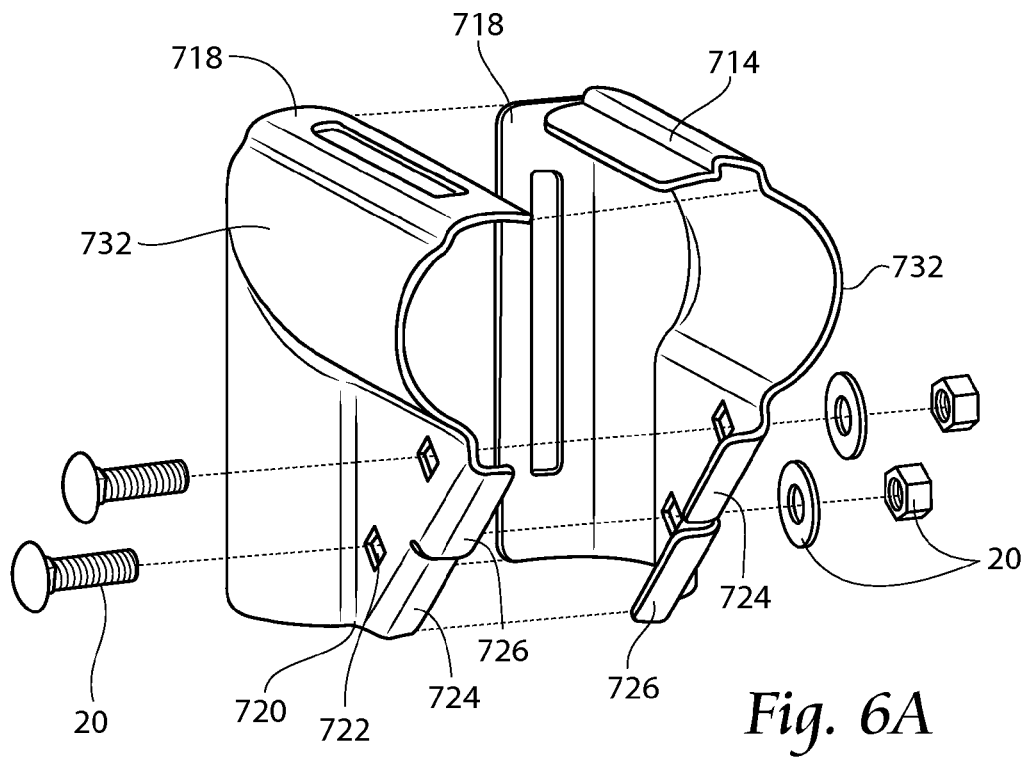
FIG. 6A is an exploded view of a sixth embodiment of a connector according to the present invention.
Figure 6B:
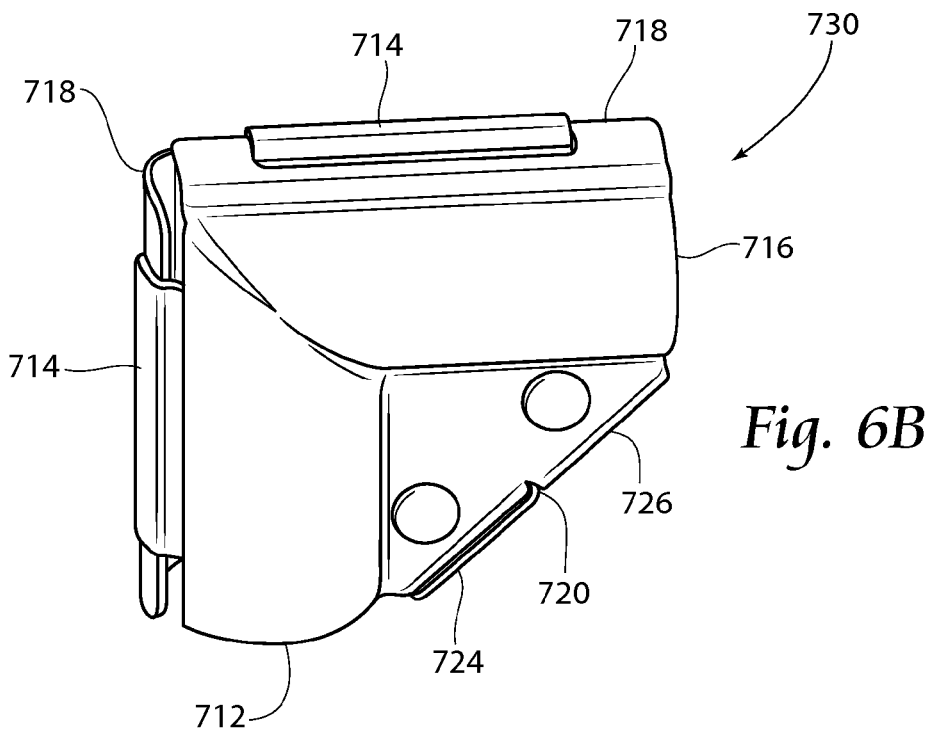
FIG. 6B is a perspective view of the connector of FIG. 6A.

The connector 700 as depicted is capable of securing two rails (not shown) at an obtuse angle relative to one another. It is within the purview of the present invention to secure two rails in any angle from 90 to 180 degrees relative to one another, with members having the same interfacing means as shown and described. It is also conceivable for the angle to be less than 90 degrees. For example, the connector 730 in FIG. 6B, comprised of two interfacing right-angle members 732 (shown in FIG. 6A), demonstrates a connector according to the present invention that is capable of securing two rails at a 90 degree angle relative to one another and using the same interfacing means as connector 700.

Additionally, it should be understood that reference to the top and the bottom of any member herein described is for reference only and should not limit it to any specific spatial arrangement. Additionally, the location of the male clasp 714, the female clasp 718, the external flange 726, and the internal flange 724 should not be considered limited as to their locations by this description. Any arrangement which allows these elements to mate with their respective counterpart as described should be considered within the scope of the present invention.

Figure 7:
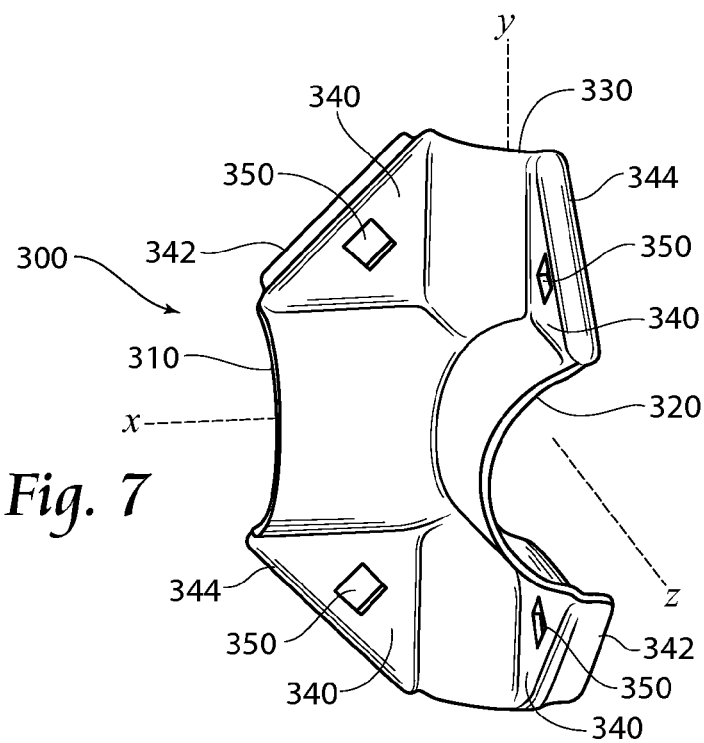
FIG. 7 is a perspective view of a one-quarter member according to the present invention.

FIG. 7 shows an embodiment of a component 300 (hereinafter the "one-quarter member"). The one-quarter member 300 has two semicircular areas 310 and 320 along the X-axis and Z-axis, respectively, and one quarter-circular area 330 along the Y-axis. The one-quarter member 300 also utilizes planar corner braces 340 located between each semicircular area 310 and 320 and the quarter-circular area 330. Wherein each corner brace 340 has a hole 350 for a fastener 20 (see FIG. 21). Furthermore, the corner braces 340 either have an internal flange 342 or an external flange 344. Although the illustration shows the corner braces with internal flanges 342 and external flanges 344 in certain locations, this should not be viewed as limiting.

Figure 8:
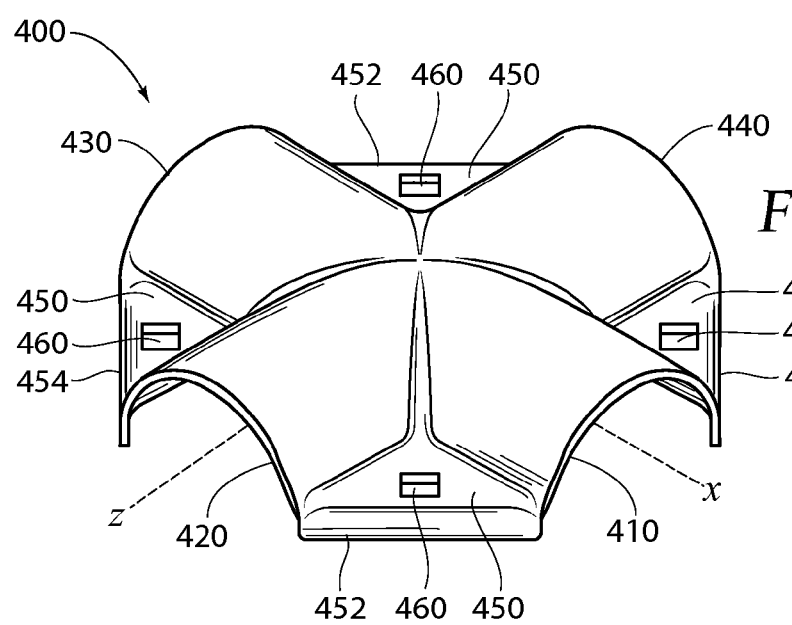
FIG. 8 is a perspective view of a biaxial member according to the present invention.
Figure 11:
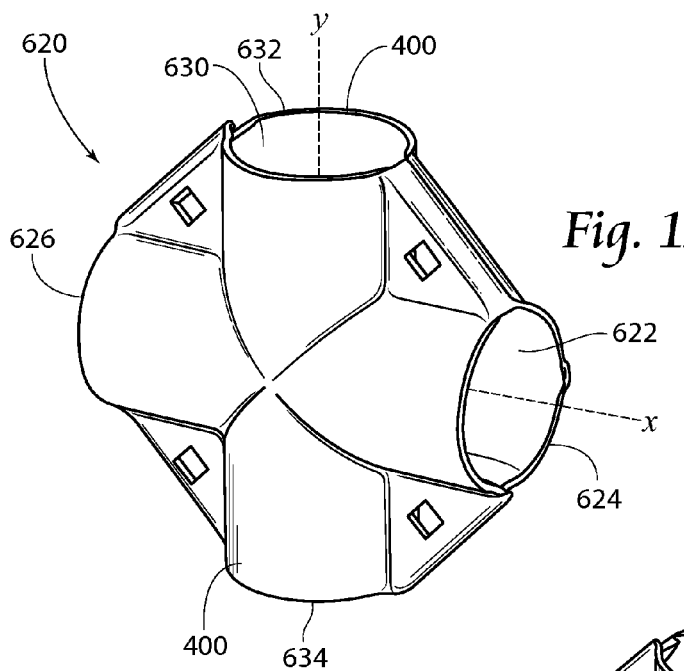
FIG. 11 is a perspective view of an eighth embodiment of a connector according to the present invention.
Figure 12A:
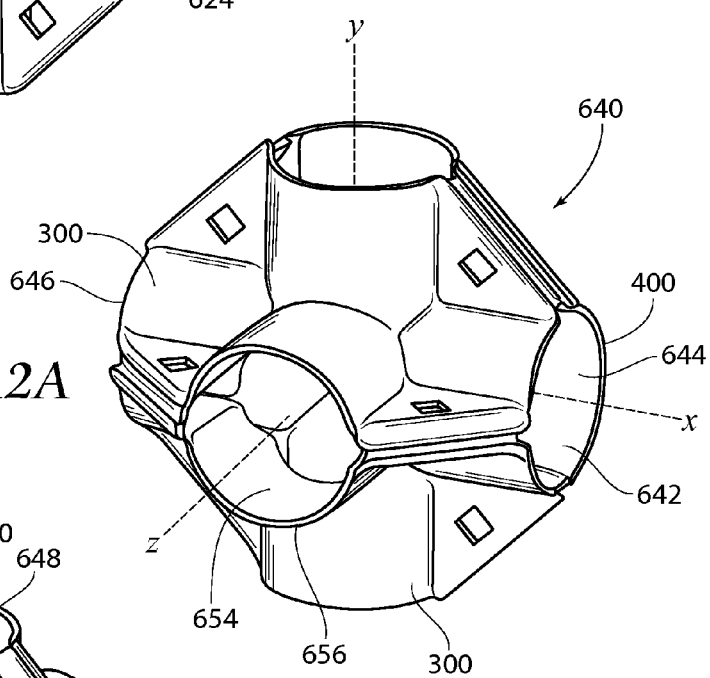
FIGS. 12A-12B demonstrate perspective views of a ninth embodiment of a connector according to the present invention.
Figure 12B:
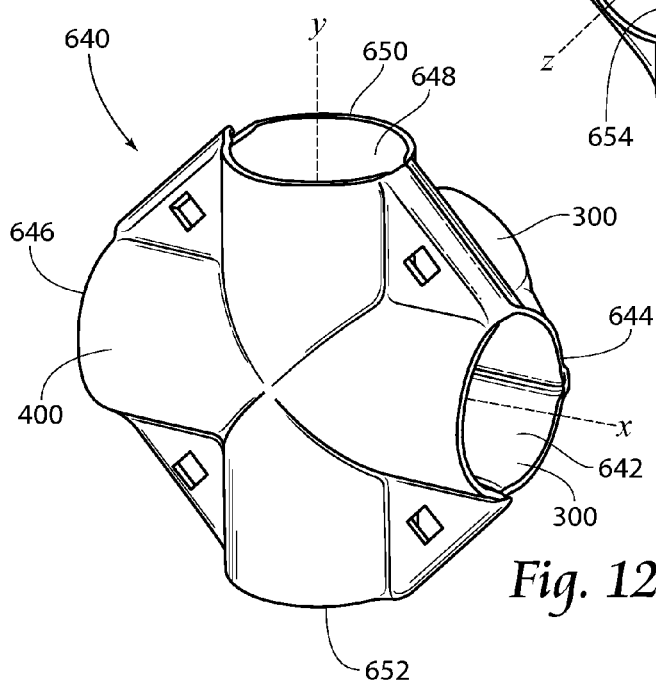

FIG. 8 illustrates an embodiment of another component 400 (hereinafter the "biaxial member") according to the present invention. The biaxial member 400 has four semicircular areas 410, 420, 430, and 440, wherein two (410 and 430) are oppositely disposed along the X-axis and two (420 and 440) are oppositely disposed along the Z-axis. The biaxial member 400 also has four planar corner braces 450 positioned between the semicircular areas 410, 420, 430, and 440 substantially similar to the corner braces discussed supra. Each corner brace 450 has either an internal flange 452 or an external flange 454 similar to the flanges discussed above. Each corner brace 450 has a hole 460 for the insertion of a fastener 20 (see FIG. 23B). The illustration as depicted in FIG. 8 should not be viewed as limiting in regards to the location of the internal flanges 452 and external flanges 454; they may be adjacent as well as opposite one another. Component 400 is designed in such a way that it can be used as shown in FIGS. 12A and 12B in combination with two one-quarter members 300 or it can be used by utilizing two component 400s as shown in FIG. 11 (discussed in more detail below). The external flanges 454 fit over the internal flanges 452 as disclosed in embodiments discussed above.

Figure 9:
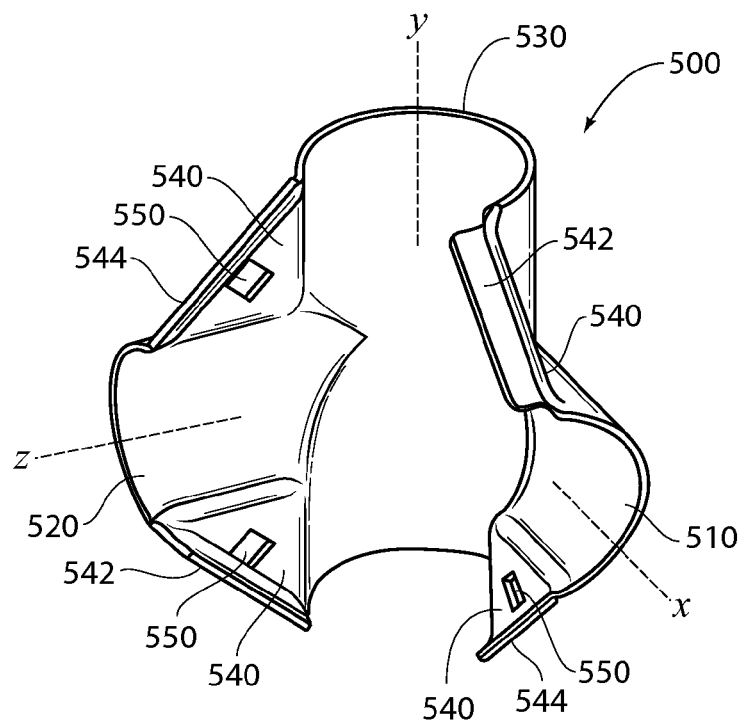
FIG. 9 is a perspective view of a three-quarter member according to the present invention.

FIG. 9 shows an embodiment of another component 500 (hereinafter the "three-quarter member"). The three-quarter member 500 has two semicircular areas 510 and 520 along the X-axis and Z-axis, respectively, and one three-quarter-circular area 530 along the Y-axis. The three-quarter member 500 also utilizes planar corner braces 540 extending between the semicircular areas 510 and 520 and the three-quarter-circular area 530, each having an opening 550 for a bolt 22 (see FIG. 23C). Wherein the corner braces 540 either have an internal flange 542 or an external flange 544. Although the illustration shows the corner braces with internal flanges 542 and external flanges 544 in certain locations, this should not be viewed as limiting.

Additionally it is further contemplated that the above disclosed components of FIGS. 7-9 may be designed to create rail channels having different orientations with respect to each other depending on the specific requirements of the connector. For example, when constructing a building it may be preferable to have connectors having channels designed at right angles; however, when constructing livestock fences for instance, it may be preferable to have rails that form obtuse angles so that the structure is not square or rectangular in shape, in which case it would be more advantageous to use connectors having rail channels similar in orientation to those of the connector shown in FIG. 3A.

Furthermore, the component members of FIGS. 7-9 may be assembled to create connectors of varying capacities as shown in FIGS. 10-13. Additionally, these connectors may be used in combination with rails to create a structure as further described below and shown in FIGS. 19-24. However, the use of the connectors should not be considered limited to the type of structure shown. Other uses include, but are not limited to, fences, corrals, shelving, decking, construction building blocks, industrial building blocks, freeway/transportation systems, and play structures.

Moreover, the present invention provides resistance to moment and translation forces between rail-to-rail and rail-to-connector connections to cover all six degrees of freedom. Looking to FIG. 10, the six degrees of freedom consist of three moments around the x, y and z axes (Mx, My, and Mz) and three translations along the x, y and z axes (Rx, Ry, and Rz).

In order to adequately resist the aforementioned forces, the rail connector members must fit tightly to the rail. The present invention contains bolted clamp features (comprising corner braces, flanges, and fasteners) positioned to provide equally displaced force on the outside of the rails. As a connector is tightened, the mechanical advantage of the fastener and the positioning of the flanges allow the connector to pull tight, generating large hoop stresses and providing resistance to translation and/or moment forces in all six degrees of freedom. Additionally, because the channels of the connectors are long compared to the rail diameter, the connectors provide an advantageous aspect ratio and the corresponding line contacts are long, promoting overall joint stability.

Figure 10:
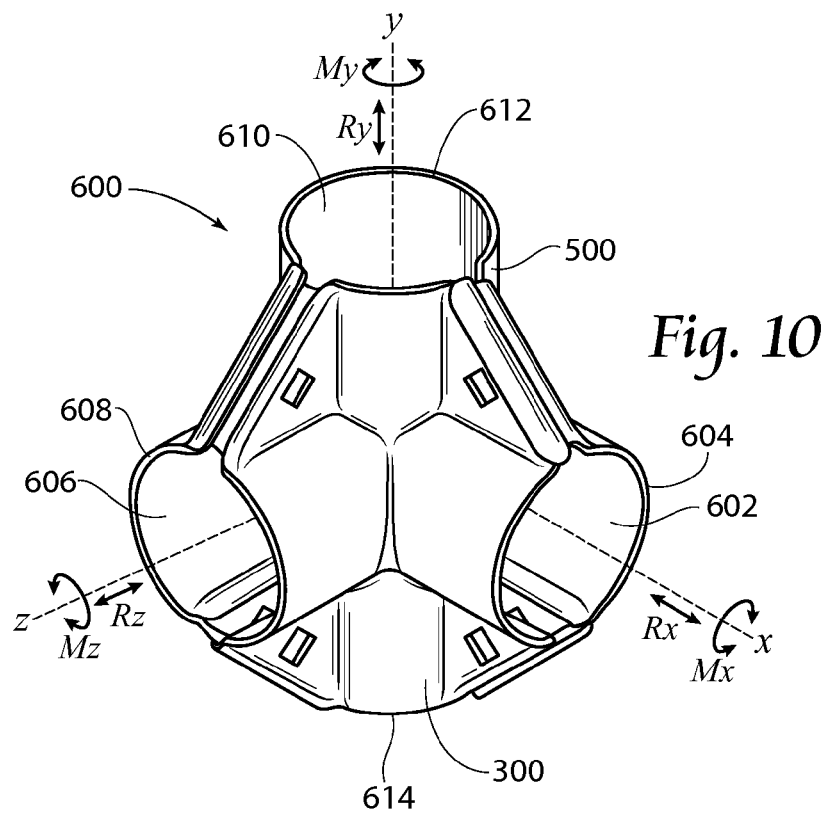
FIG. 10 is a perspective view of a seventh embodiment of a connector according to the present invention.

Still looking at FIG. 10 wherein a corner connector 600 is shown. The corner connector 600 combines a one-quarter member 300 with a three-quarter member 500 to form a connector 600 having a terminal channel 602 along the X-axis, a terminal channel 606 along the Z-axis, and a through channel 610 along the Y-axis. Terminal channels 602 and 606 each have a receiving end 604 and 608, respectively, for inserting rails (see FIG. 23C). The through channel 610 has a first receiving end 612 and a second receiving end 614. Inserted rails are limited in insertion depth due to abutment with the connector itself or other inserted rails. It is conceived that the through channel 610 may house one continuous rail therethrough or two conjoining rails, wherein one rail is inserted in the first receiving end 612 and the other rail is inserted in the second receiving end 614.

FIG. 11 depicts a four-way connector 620 which is a combination of two biaxial members 400 (shown in FIG. 8). The four-way connector 620 provides a through channel 622 along the X-axis and a through channel 630 along the Y-axis. The X-axis through channel 622 has a first receiving end 624 and a second receiving end 626. Additionally, the Y-axis through channel 630 has a first receiving end 632 and a second receiving end 634. Inserted rails are limited in insertion depth due to abutment with the connector itself or with other inserted rails. It should be understood that either one of the two channels 622 or 630 may house a continuous rail while the other houses two conjoining rails, or, in the alternative, both channels 622 and 630 may each house two conjoining rails.

FIGS. 12A and 12B show a five-way connector 640. The five-way connector 640 is a combination of one biaxial member 400 and two one-quarter members 300. It has a through channel 642 along the X-axis, having a first receiving end 644 and a second receiving end 646; a through channel 648 along the Y-axis, having a first receiving end 650 and a second receiving end 652; and a terminal channel 654 along the Z-axis having a receiving end 656. All of the channels 642, 648, and 654 are capable of receiving a rail (not shown). Inserted rails may be limited in insertion depth due to abutment with the connector itself or with other inserted rails. It is conceived that either one of the two through channels 642 or 648 may house a continuous rail while the other through channel houses two conjoining rails. In the alternative, it is also possible for both through channels 642 and 648 to house two conjoining rails each.

Figure 13:
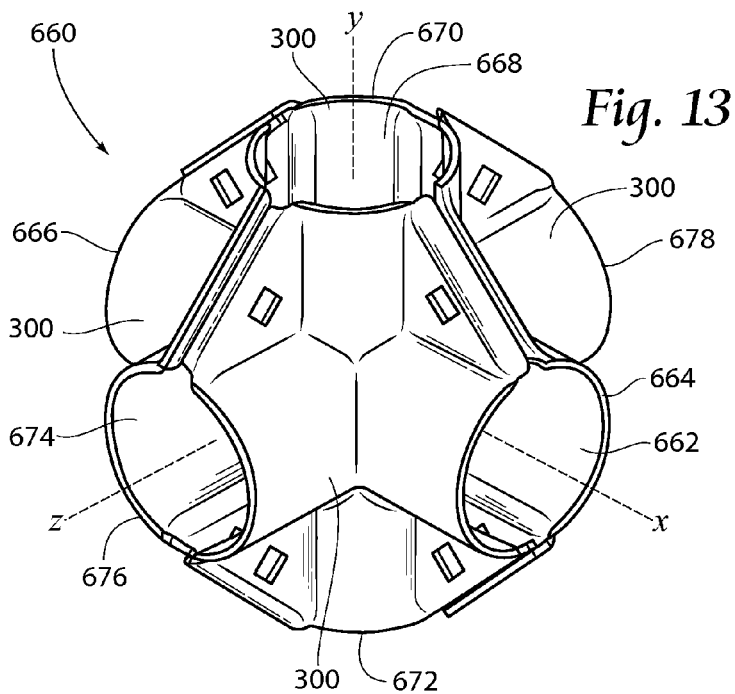
FIG. 13 demonstrates a perspective view of a tenth embodiment of a connector according to the present invention.

Moving now to FIG. 13, in which a six-way connector 660 is depicted. The six-way connector 660 is a combination of four one-quarter members 300 and provides a through channel 662 along the X-axis having a first receiving end 664 and a second receiving end 666; a through channel 668 along the Y-axis having a first receiving end 670 and a second receiving end 672; and a through channel 674 along the Z-axis having a first receiving end 676 and a second receiving end 678. All of the channels are capable of receiving a rail (not shown). Inserted rails may be limited in insertion depth due to abutment with the connector itself or with other inserted rails. It is conceived that any one of the three through channels 662, 668, or 674 may house a continuous rail while the other through channels house two conjoining rails, respectively. In the alternative, it is also possible for all three channels 662, 668, and 674 to house two conjoining rails each.

Figure 14:
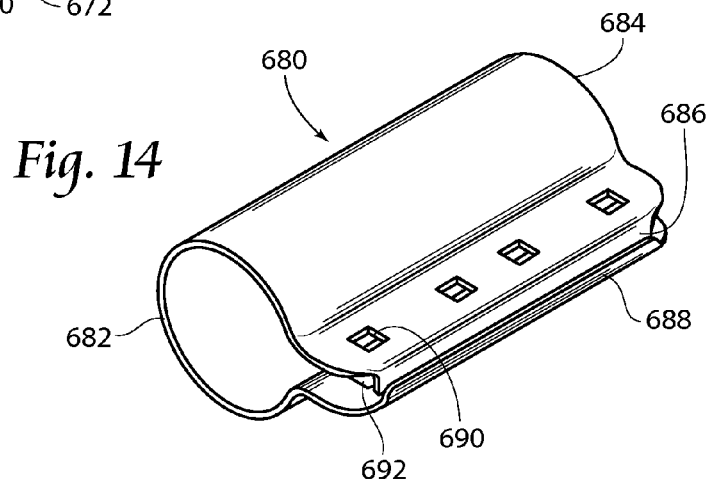
FIG. 14 demonstrates a perspective view of an eleventh embodiment of a connector according to the present invention.

FIG. 14 shows a uniaxial connector 680. The uniaxial connector 680 has a first receiving end 682 and a second receiving end 684. It may be used to conjoin two rails (not shown) along the same axis and employs the same brace and internal/external flange relationship as disclosed above with its internal flange 686 and external flange 688 creating a clamping stress in the connector as the connector 680 is secured against the rails with fasteners (not shown) inserted and tightened in holes 690 and 692.

Figure 15:
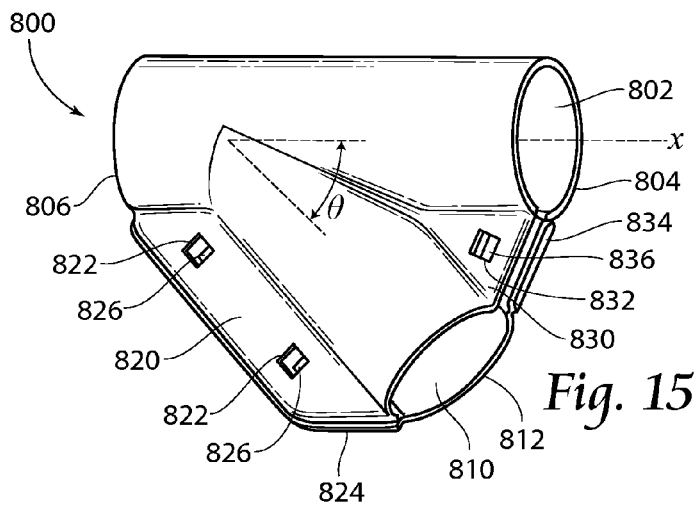
FIG. 15 demonstrates perspective views of a twelfth embodiment of a connector according to the present invention.

Further illustrated in FIG. 15 is another embodiment according to the present invention. Angle connector 800 has a through channel 802 along the X-axis having a first receiving end 804 and a second receiving end 806. Angled terminal channel 810, having a receiving end 812, extends at angle θ from the through channel 802. Additionally, there is an obtuse angle brace with internal flange 820 with holes 822 which interfaces with an obtuse angle brace with external flange 824 with holes 826. Moreover, the angle connector 800 has an acute angle brace with internal flange 830 with hole 832 which interfaces with an acute angle brace with external flange 834 with hole 836. As described before, fasteners (not shown) may be inserted through holes 822, 826, 832, and 836 and tightened to create a clamping stress in the connector.

Figure 16A:
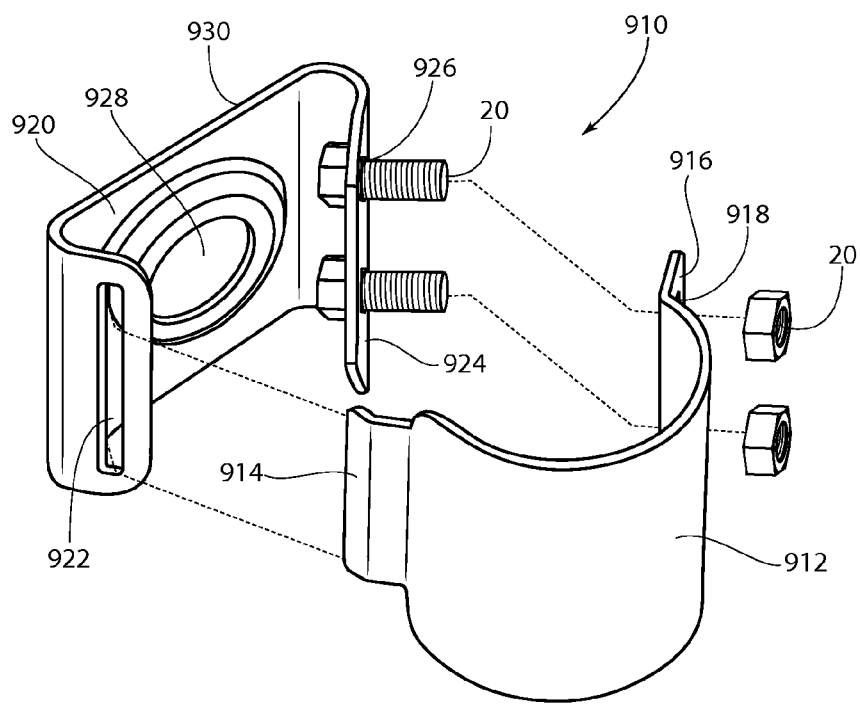
FIG. 16A is an exploded view of a thirteenth embodiment of a connector according to the present invention.
Figure 16B:
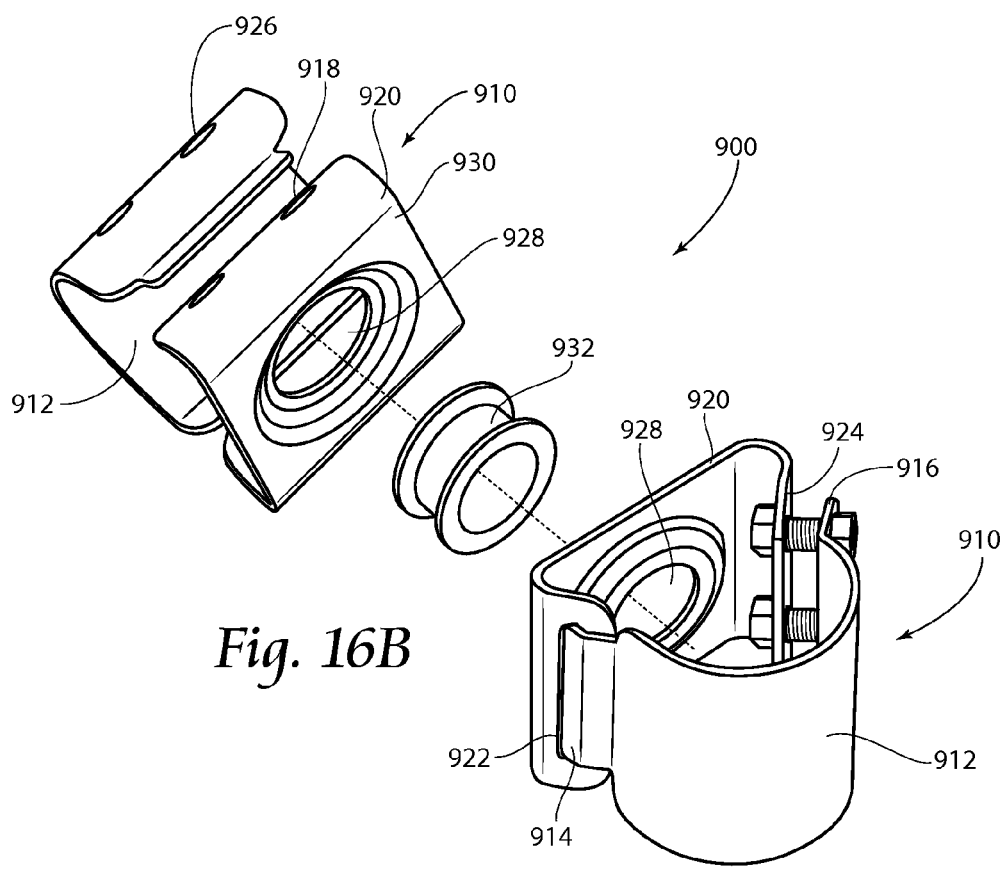
FIG. 16B is a further exploded view of a rotatable connector according to the present invention, incorporating the connector of FIG. 16A.

FIGS. 16A and 16B illustrate another embodiment of the present invention in which a swivel connector 900 provides infinite swivel adjustment between two rails (not shown) incorporating the over/under clasp as described above for connector 700; however, any clasp herein described or equivalent may be employed.

FIG. 16A illustrates one of the two securing members 910 of the swivel connector 900. The securing member 910 has an outer element 912 having a circular profile as to fit around a rail (not shown) and a swivel element 920. On one end of the outer element 912 is a male clasp 914, and on the other end is a flange 916 having at least one hole 918 for a fastener 20. The swivel element 920 has a relatively flat profile. It has a female clasp 922 on one end and a flange 924 having at least one hole 926 on the other end for a fastener 20. The outer element 912 attaches to the swivel element 920 through the mating of the male clasp 914 and the female clasp 922, and insertion and tightening of a fastener 20 through the holes 918 and 926. In the alternative, the outer element 912 may have a female clasp and the swivel element 920 may have a male clasp.

Additionally, the swivel element 920 has an opening 928 in a base portion 930 for the placement of a hub 932. The hub 932 provides both a connection point and a swivel point between two mating securing members 910, thus providing a connector 900 which provides infinite swivel. Tightening of the fasteners 20 not only secures the rails (not shown) into their respective securing member 910 but also applies pressure to the hub 932, thereby prohibiting rotation of the securing members 910.

The hub may be comprised of material which provides both strength and the ability to rotate the securing members 910 relative to one another. One such material is 1008 cold rolled steel; however, other metals or composite materials having the preferred characteristics are also within the scope of the present invention.

Figure 17:
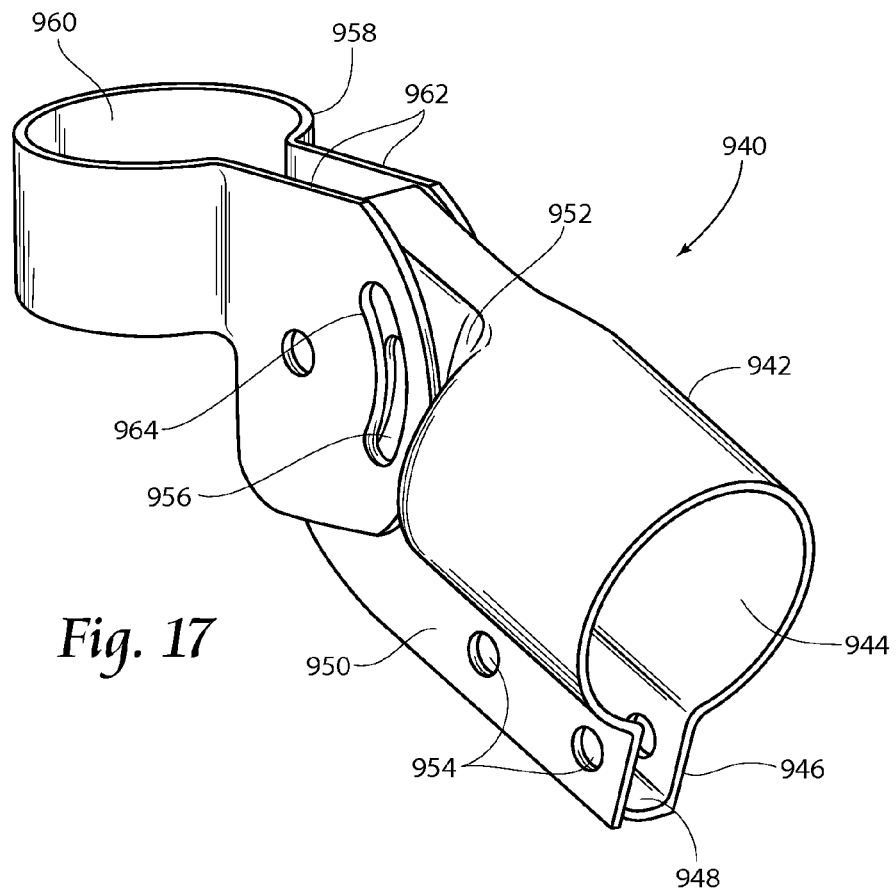
FIG. 17 illustrates a fourteenth embodiment of a connector according to the present invention.

Now looking to FIG. 17 in which pivot connector 940 according to the present invention is shown. The pivot connector 940 has a channel member 942 pivotally mounted to a collar member 958. The channel member 942 has a channel 944 and a first brace 946 and a second brace 950 facing the first brace 946, each extending along the channel 944 and continuing around the back 952 of the channel 944. The first brace 946 is shown with a flange 948 extending perpendicular to the first brace 946 and in the direction of the second brace 950. Additionally, both the first brace 946 and the second brace 950 have holes or apertures 954 therethrough which may receive fasteners 20 (as shown in FIG. 16A). Furthermore, the portions of the first and second braces 946 and 950 at the back 952 of the channel 944 each comprise a curved track 956 having approximately a 45° bend.

Further, the collar member 958 comprises a band 960 and two pivot members 962. Each pivot member 962 comprises a curved track 964 which is alignable with the channel member curved track 956. The pivot member curved track 964 also has a curve covering approximately a 45° bend. Therefore, the channel member 942 is capable of rotating a total of approximately 90° relative to the collar member 958.

Moreover, a fastener 20 (as shown in FIG. 16A) may be received through the curved tracks, 956 and 964, and tightened to secure the preferred position of the channel member 942 relative to the collar member 958, and further providing additional clamping stress in the connector to secure the rails 34, 36, 38 (as shown in FIG. 23A).

Figure 18:
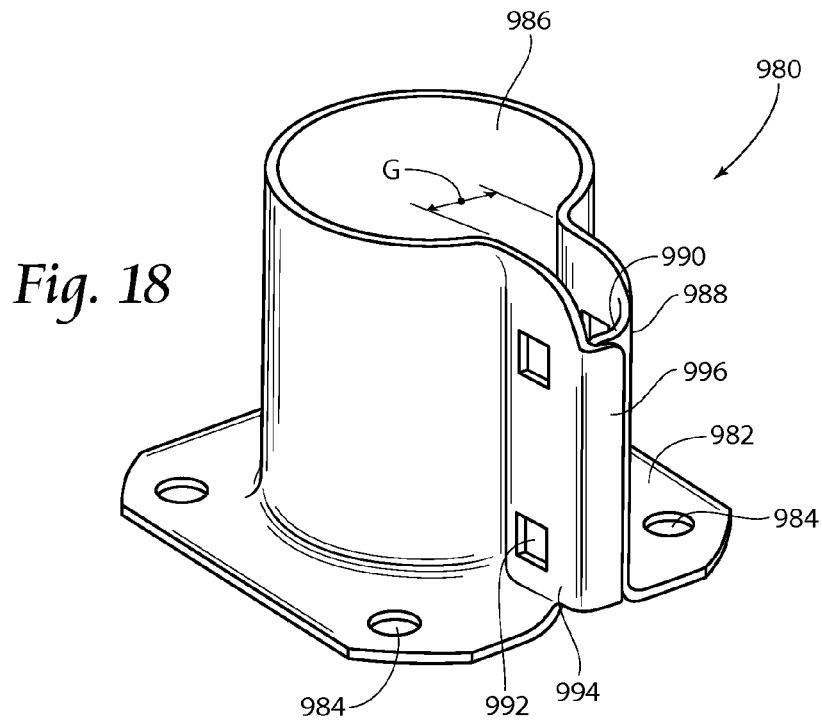
FIG. 18 illustrates a fifteenth embodiment of a connector according to the present invention.
Figure 19:
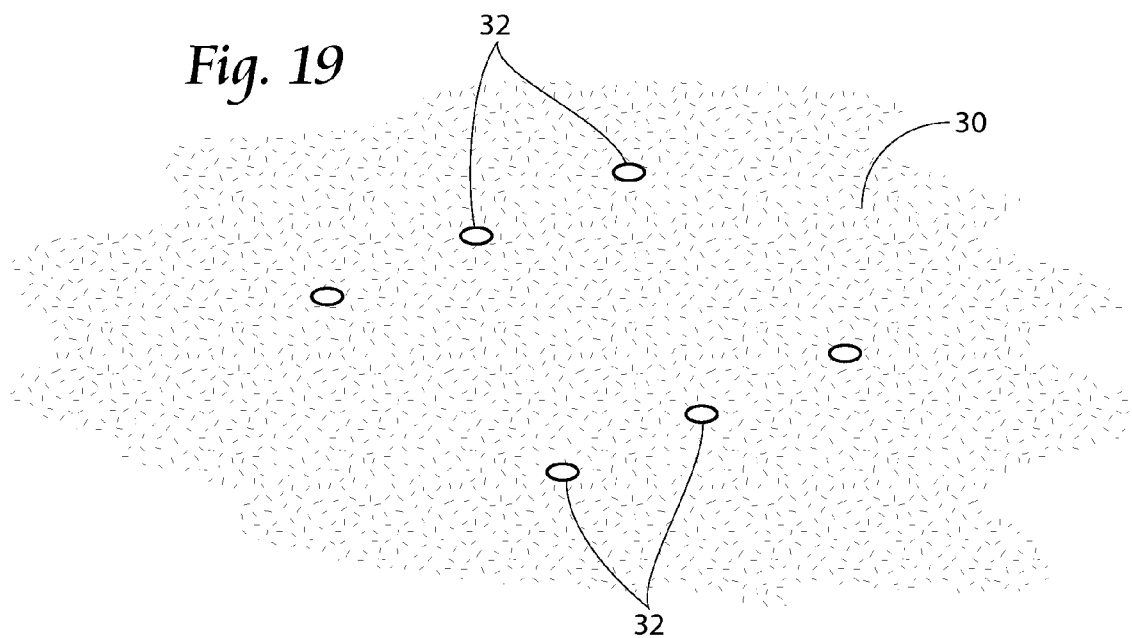
FIGS. 19-24 illustrate construction of a structure according to the present invention.

FIG. 18 illustrates a base member 980 according to the present invention. The base member 980 comprises a base plate 982 and a channel 986. The base plate 982 is positioned on one end of the channel 986 and extends radially substantially about the periphery of the channel 986. The base plate 980 further comprises apertures 984 to receive fasteners 20 (not shown here) which may be used to secure the base member 980 to a surface 30 (shown in FIG. 22).

The channel 986 comprises a first brace 988 and a second brace 994 facing the first brace 988, both extending radially outward from and along the channel 986. As shown here, each brace 988 and 994 comprise a flange 990 and 996, respectively. The flanges 990 and 996 extend perpendicular to the respective braces 990 and 996 and in the direction of the other brace 988 or 994. Additionally, the first brace 988 and the second brace 994 comprise apertures 992 to receive fasteners 20 (as shown in FIG. 16A).

Further, a gap G extends between the first brace 988 and the second brace 994 and through the base plate 982. The gap 998 further permits the base plate 982 to conform to the shape of a rail 36, 38 or an upstanding pole 34 (see FIG. 23A) as the fasteners 20 (as shown in FIG. 16A) are tightened.

As shown, the present invention provides a connector that can have various designs and arrangements to receive varying numbers of rails at varying angles. The connectors help to provide resistance to moment forces and provide resistance to translation forces between the rails as well as between the rails and the connectors by inducing clamping stress in the connector. This provides a more structurally sound arrangement compared to prior art devices.

Figure 20:
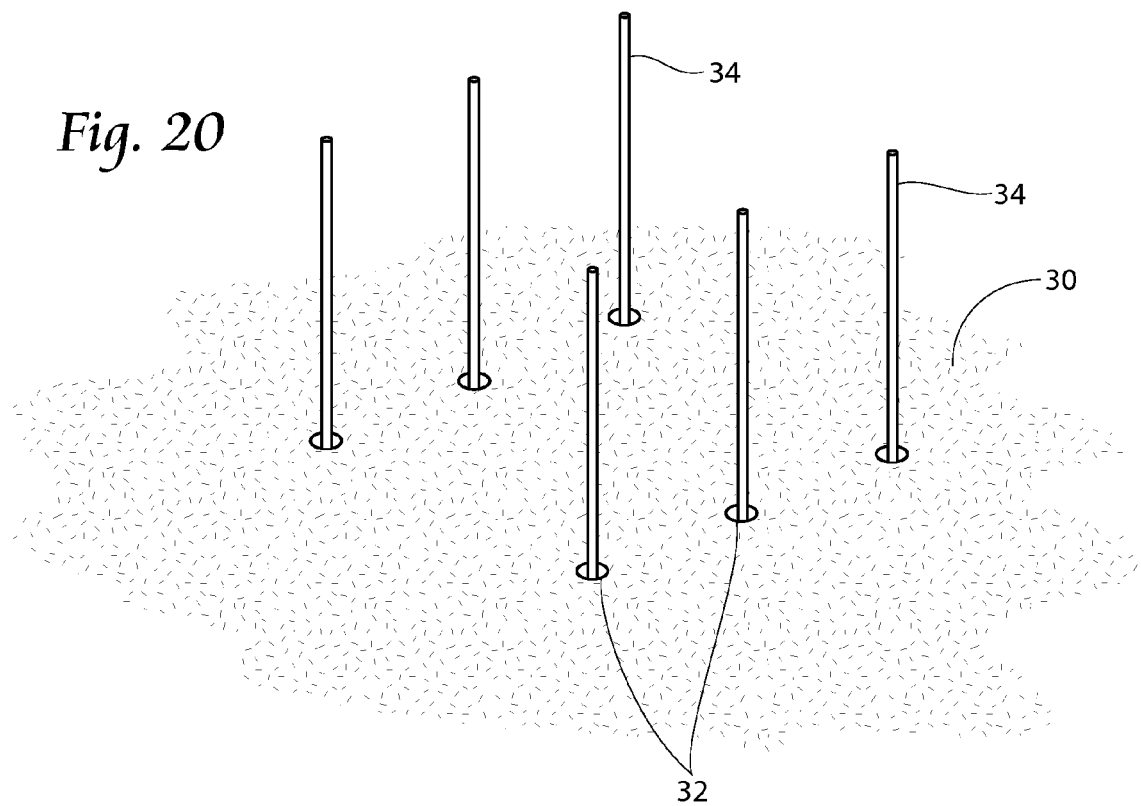
Figure 22:
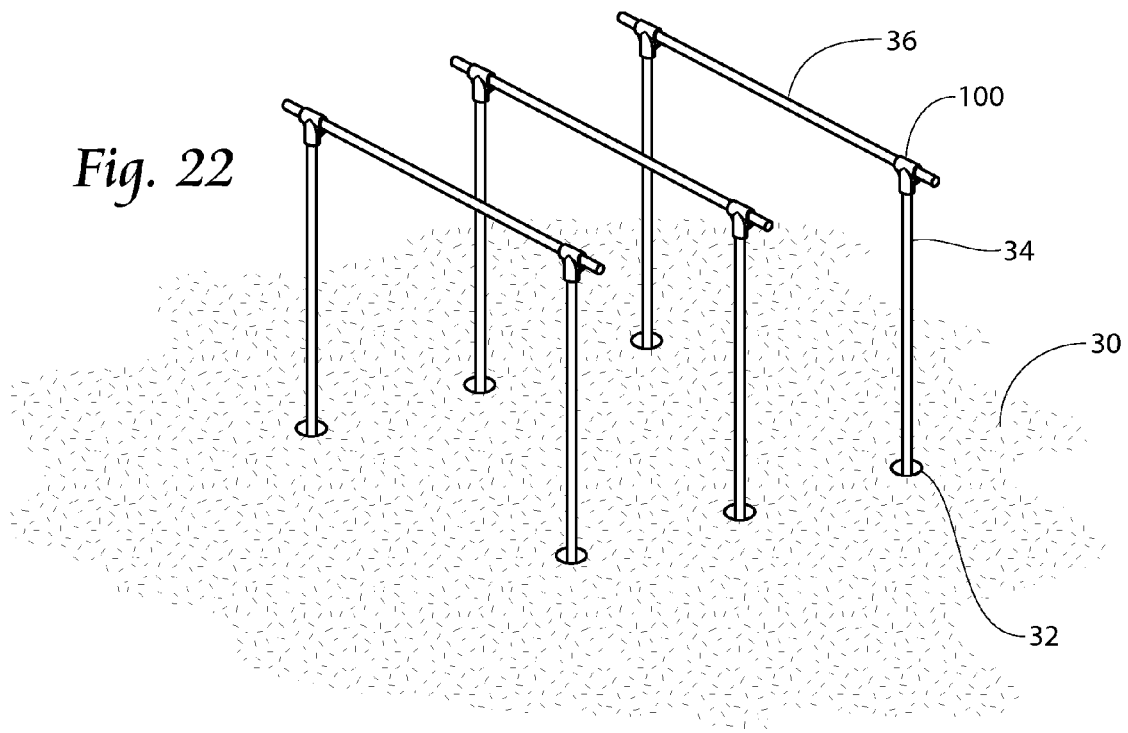

FIGS. 19-24 illustrate use of the aforementioned connectors in the construction of a structure. FIG. 20 shows a surface 30 for constructing a building 40 (shown completed in FIG. 24) using connectors of the present invention. Holes 32 are placed in a surface 30 at predetermined distances apart for placement of upstanding poles 34, as shown in FIG. 20. In the alternative, the base connector 980 may be secured to the surface 30 in any manner known in the art and the upstanding poles may be received within the base connector channel 986. Once the upstanding poles 34 are in position, horizontal rails 36 can be placed upon the upstanding poles 34, as shown in FIG. 22. The horizontal rails 36 are used as the frame for an eventual roof structure 42 (shown in FIG. 24).

The horizontal rails 36 are affixed with a connector 100 designed according to the present invention, as shown in FIG. 21. The horizontal rails 36 are inserted through the through channel 120 within each of the connectors 100, and the terminal channels 110 of the connectors 100 are placed upon the upstanding poles 34. The connectors 100 can then be clamped with further securing means 20, e.g. nuts 24 and carriage bolts 22. Upon securing the connectors together, large forces and clamping stresses are produced providing a very secure joint. In a similar way the joint is also secured from sliding or turning in all degrees of freedom.

Figure 23C:
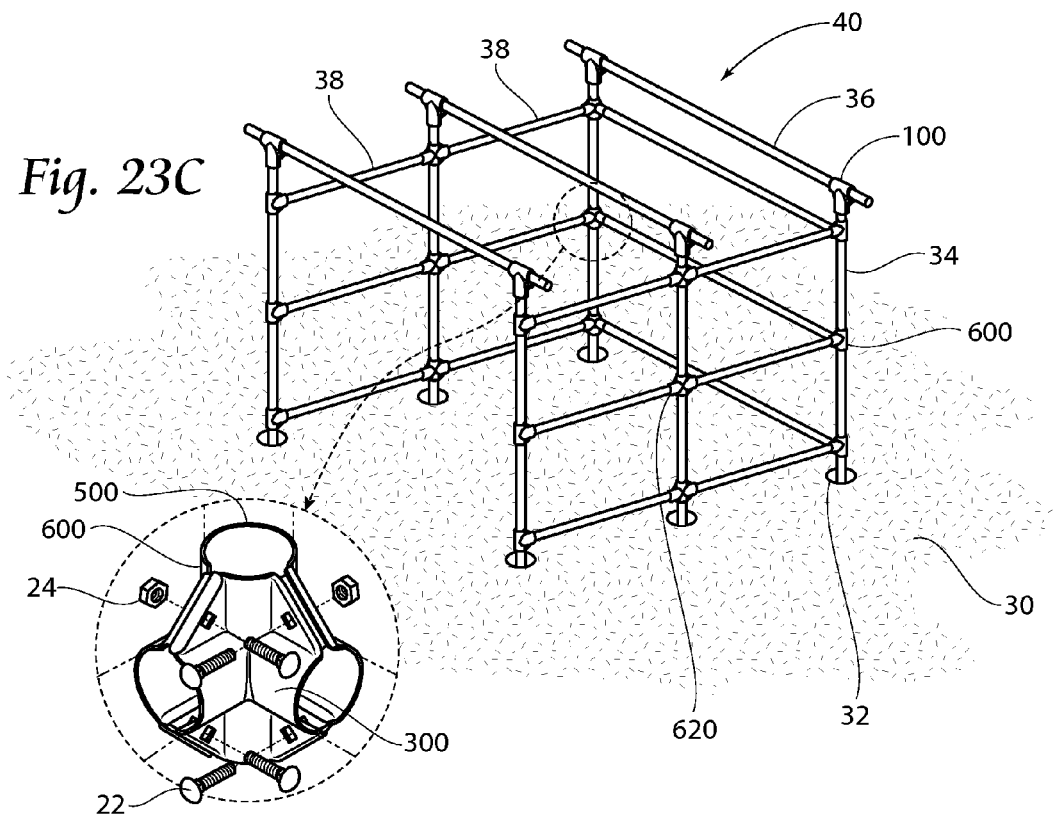

FIG. 23A shows the addition of further rails to the structure 40, with the additional rails 38 being used as sidewall structures. The rails 38 are attached similarly as previously described, with the rails 38 being inserted into a respective channel located in the connector. For instance, FIG. 23B illustrates the use of a four-way connector 620 and FIG. 23C depicts the use of a corner connector 600. Furthermore, once the rails 34, 36, and 38 are situated as desired, the connectors may be tightened with the fastening means 20.

Figure 24:
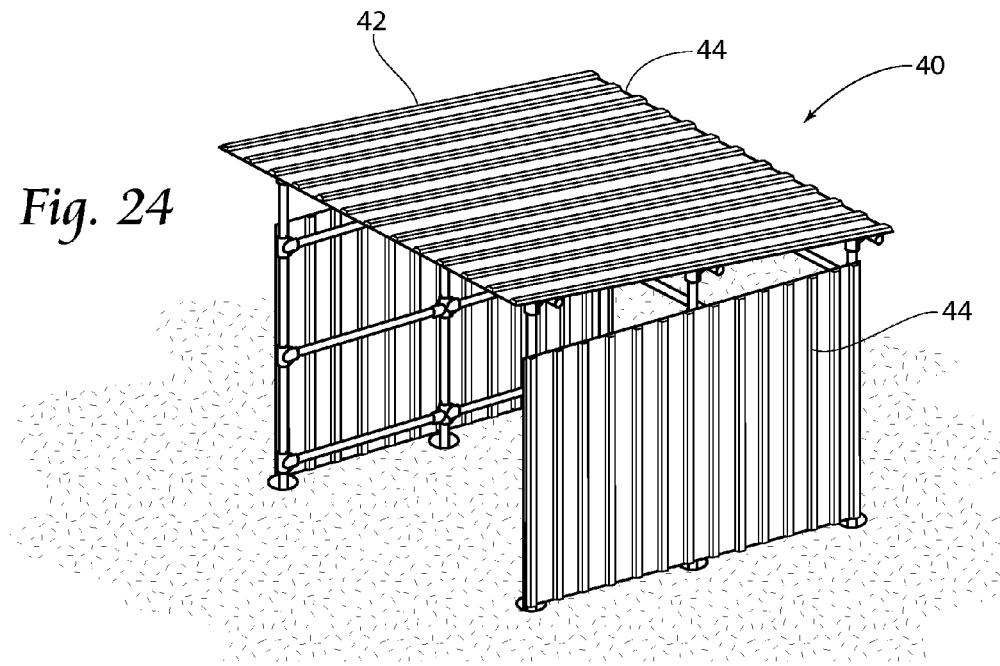

After the frame has been constructed, the building may be finished by attaching siding 44 to the walls and the roof, as shown in FIG. 24.

It is fully conceivable that after a structure 40 has been erected, changes or additions may be needed. The component designs of the present invention fully allow for this. For instance, it may be desired to add on to the structure 40 of FIG. 24 by adding another structure wherein the two structures share a common wall. Looking to FIGS. 21B and 21C for easier explanation, if it is desired to have two structures sharing a common wall one would remove the three-quarter members 500 from the corner connectors 600 at the back of the structure 40 by removing the fastening means 20, then install a biaxial member 400 and another one-quarter member 300 to create a five-way connector 640. And it is further conceived that a six-way connector 660 may be used at this joint if it is desired to add another wall extending from the rear of the structure 40. During this procedure, external structural support (not shown) may be needed to maintain structural integrity.

As is evident by the various connectors that are incorporated within the scope of the present invention, the structures that the connectors can be used with include numerous designs of buildings, as well as fencing structures, and other upstanding structures. For example, the connectors, along with the corresponding rail system could be used for livestock fencing.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

I claim:

1. A connector for joining rail members of a fence or a structure, the connector comprising:
    at least one connector member including at least one channel;
    a plurality of brace members extending outward from and along the at least one channel, each brace member having at least one brace aperture therethrough, each brace member facing one other brace member with the respective brace member apertures aligned;
    a flange projecting substantially perpendicular from a distal end of each of the plurality of brace members in a direction of the facing brace member, whereby the flanges of the facing brace members overlap, each flange having a continuous uninterrupted surface, therein providing an external flange and an internal flange;
    the at least one channel having a non-continuous periphery, defining a gap between facing brace members; and
    a fastener received by each aligned set of apertures, whereby when the fastener is tightened the facing brace members are pulled toward each other, inducing a hoop stress about a retained rail member.

2. The connector of claim 1, wherein the at least one connector member is a plurality of connector members.

3. The connector of claim 2, wherein each of the plurality of connector members comprises at least one of an inner clasp and an outer clasp extending outward from and along the at least one channel opposite the respective brace member.

4. The connector of claim 1 further comprising a swivel mechanism.

5. The connector of claim 4, wherein the swivel mechanism comprises an opening and a hub received by the opening.

6. The connector of claim 1 further comprising a pivot mechanism and a collar, whereby the pivot mechanism pivotally joins the connector and the collar.

\* \* \* \* \*